United States Patent [19]

Chase et al.

[11] 4,021,820

[45] May 3, 1977

[54] LIGHTHOUSE HAVING A MAIN FILTER AND A SUPPLEMENTAL FILTER

[75] Inventors: Thomas Louis Chase, Lancaster, Pa.; Dino Duranti; Renato Sassoli, both of Rome, Italy

[73] Assignees: RCA Corporation, New York, N.Y.; Videocolor S.A., Paris, France; part interest to each

[22] Filed: Oct. 23, 1975

[21] Appl. No.: 625,037

Related U.S. Application Data

[62] Division of Ser. No. 389,727, Aug. 20, 1973, Pat. No. 3,953,209.

[52] U.S. Cl. .................................................. 354/1

[51] Int. Cl.² ........................................ G03B 21/20

[58] Field of Search ............... 354/1; 96/36.1, 38.3; 313/478; 355/71

[56] References Cited

UNITED STATES PATENTS

| | | | |
|---|---|---|---|
| 3,420,150 | 1/1969 | Kaplan | 354/1 |
| 3,569,761 | 3/1971 | Lange | 96/36.1 X |
| 3,592,112 | 7/1971 | Frey | 354/1 |
| 3,676,129 | 7/1972 | Ragland, Jr. | 96/38.3 |
| 3,788,848 | 1/1974 | Morrell | 96/36.1 |

*Primary Examiner*—Edna M. O'Connor
*Attorney, Agent, or Firm*—G. H. Bruestle; L. Greenspan

[57] ABSTRACT

An exposure lighthouse for use in printing screen structures for cathode-ray tubes comprising a lens assembly including a diffracting optical element, a main intensity-correction filter and a supplemental intensity-correction filter in series with the main filter. Both of the filters comprise preformed carbon particles in a light - transmitting binder.

1 Claim, 8 Drawing Figures

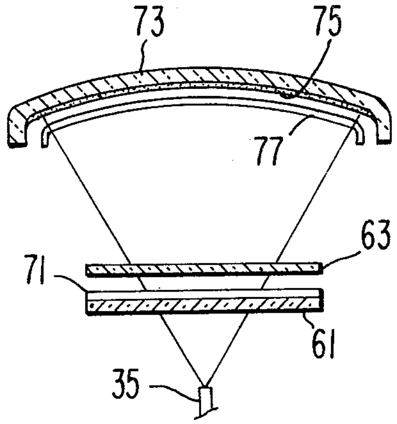
Fig. 4
Fig. 5
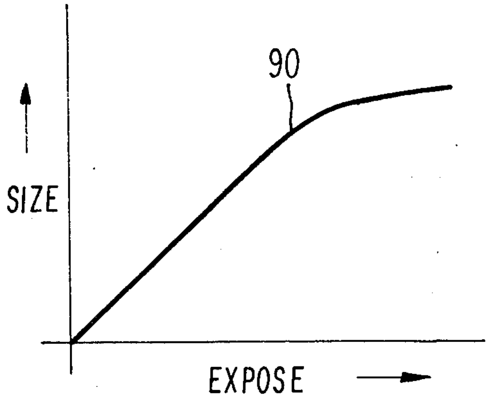
Fig. 6
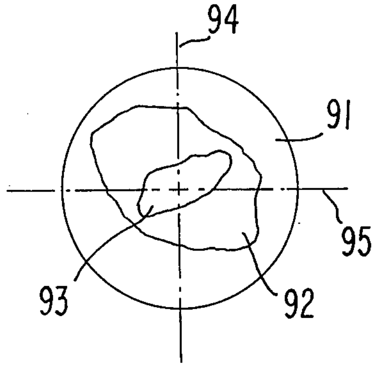
Fig. 7
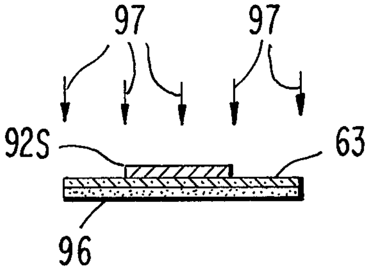
Fig. 8
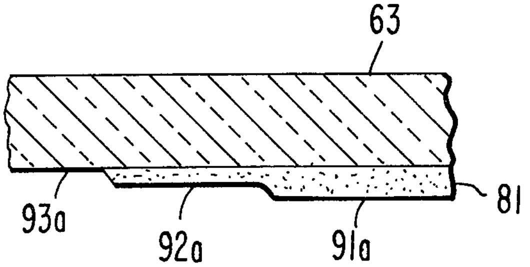

LIGHTHOUSE HAVING A MAIN FILTER AND A SUPPLEMENTAL FILTER

This is a division, of application Ser. No. 389,727, filed Aug. 20, 1973, now U.S. Pat. No. 3,953,209.

BACKGROUND OF THE INVENTION

This invention relates to a novel exposure lighthouse and to a novel method for making a supplemental intensity-correction filter for that lighthouse. A lighthouse of this type may be used, for example, for manufacturing screen structures for cathode-ray tubes, such as color television picture tubes.

Lighthouses and their use for preparing screen structures for cathode-ray tubes are described in the prior art, such as in U.S. Pat. No. 2,817,276 to D. W. Epstein et al and elsewhere. Such lighthouses may include a lens assembly comprised of one or more optical elements and means for projecting a light field from a substantially point light source through the lens assembly and then incident upon a layer of light-sensitive material on the surface of the support for the screen structure.

The prior art notes that the light intensity across the light field at the light-sensitive layer is not uniform due to causes which may be inherent in the geometry of the optical system or may be due to imperfections in parts of the optical system. It has also been found desirable to provide a tailored gradation in brightness in the light field. It has been proposed to correct nonuniformities in the light field and to provide a tailored gradation of brightness by interposing in the lens assembly an intensity-correction filter. One such filter is described in U.S. Pat. No. 3,592,112 to Harry R. Frey. Such a filter may be prepared, for example, by positioning a photosensitive layer containing light-attenuation material in the lens assembly, exposing the layer to the light field from the light source until the layer, upon development, produces a light-attenuating filter which is a negative of the intensity variations in the light field. By employing a dodger or similar expedient, the filter may also provide a tailored gradation of brightness in the light field. After development, this light-intensity-correction filter is returned to its position in the lighthouse where it is used in combination with the particular light source and lens assembly with which it was made.

In many cases, the intensity-correction filter is deficient in some areas thereof. Also in some cases, one may want to make additional corrections to the optical system or one may want to modify the system to prepare other particular screen structures. It is desirable that these corrections and modifications be made without scrapping the intensity-correction filter. It is also desirable that the correction and modification be made at locations where limited equipment and skill capabilities for making filters are available.

SUMMARY OF THE INVENTION

The invention provides a novel exposure lighthouse including a lens assembly having a main light-intensity-correction filter plus a supplemental intensity-correction filter which provides the desired corrections and/or modifications to the main intensity-correction filter. The supplemental filter is optically in series with the main intensity-correction filter so that attenuations produced by the two filters are multiplicative. An advantage of the novel lighthouse is that it may be intermittently upgraded in performance or may be adapted to be used for making other screen structures simply by replacing the supplemental filter.

The supplemental filter may be made by a novel method comprising the following steps. First, print a screen structure using only the main intensity-correction filter. Second, compare the printed screen structure with a desired screen structure and determine the differences in sizes between corresponding screen elements. Third, calculate the differences in brightness at points in the light field at the screen supporting surface required to provide the desired screen structure. Next, produce on an optical element of the lens assembly, a supplemental filter whose transmission characteristics correspond to said differences in brightness.

One advantage of the novel method is that the main intensity-correction filter may be fabricated with most of the corrections incorporated therein at a central location where special equipment and skills are available, while the supplemental filter with only supplemental corrections therein may be made at a remote location where only limited equipment and skills for making filters are available. The modification and/or correction to the light field does not require scrapping of the main intensity-correction filter. The novel method does not require an image reversal. The novel method may employ a flood exposure for making the supplemental filter. Employing a flood exposure simplifies the fabrication and makes the printing of the supplemental filter independent of the collimator and light source of the lighthouse.

BRIEF DESCRIPTION OF THE DRAWINGS

FIG. 4 is a schematic sectional view of a lighthouse during the printing of a screen structure by exposure without a supplemental filter.

FIG. 5 is a graph showing the relationship of exposure and screen-element size for the exposed and developed layer shown in FIG. 4.

FIG. 6 is a diagram of the calculated location of areas requiring similar adjustments in exposure.

FIG. 7 is a sectional view showing the photoexposure through light-opaque stencils used to produce the supplemental filter.

FIG. 8 is a sectional view of a fragment of the supplemental filter showing the differences in thickness of the filter.

DESCRIPTION OF THE PREFERRED EMBODIMENTS

The Lighthouse and Its Operation

The novel method may be used for preparing a supplemental intensity correction filter for printing the phosphor elements for a screen for a 25-inch 110°-deflection shadow-mask-type picture tube. Since shadow-mask-type picture tubes are described in the prior art, they need not be described in detail here. Generally, however, the tube is comprised of an evacuated glass envelope including an electron gun-mount assembly, a funnel assembly, and a faceplate-panel assembly.

In manufacturing the tube, the faceplate-panel assembly is completed as a unit. The panel assembly includes the faceplate panel, an apertured shadow mask mounted therein, and a viewing screen supported on the inner surface of the panel. The panel includes a viewing window, sidewalls and mask-mounting studs extending from the sidewalls. The mask mounts on the studs in a predetermined spaced relation with the inner surface of the viewing window. The viewing screen is made up of various structures, some of which are deposited on the inner surface of the viewing window by a photographic printing method including coating the inner surface of the viewing window with a photosensitive material comprising, for example, polyvinyl alcohol, a dichromate photosensitizer for the alcohol, and particles of phosphor. The mask is inserted into position on the studs and then exposed according to the novel method on a lighthouse.

Figure 1:
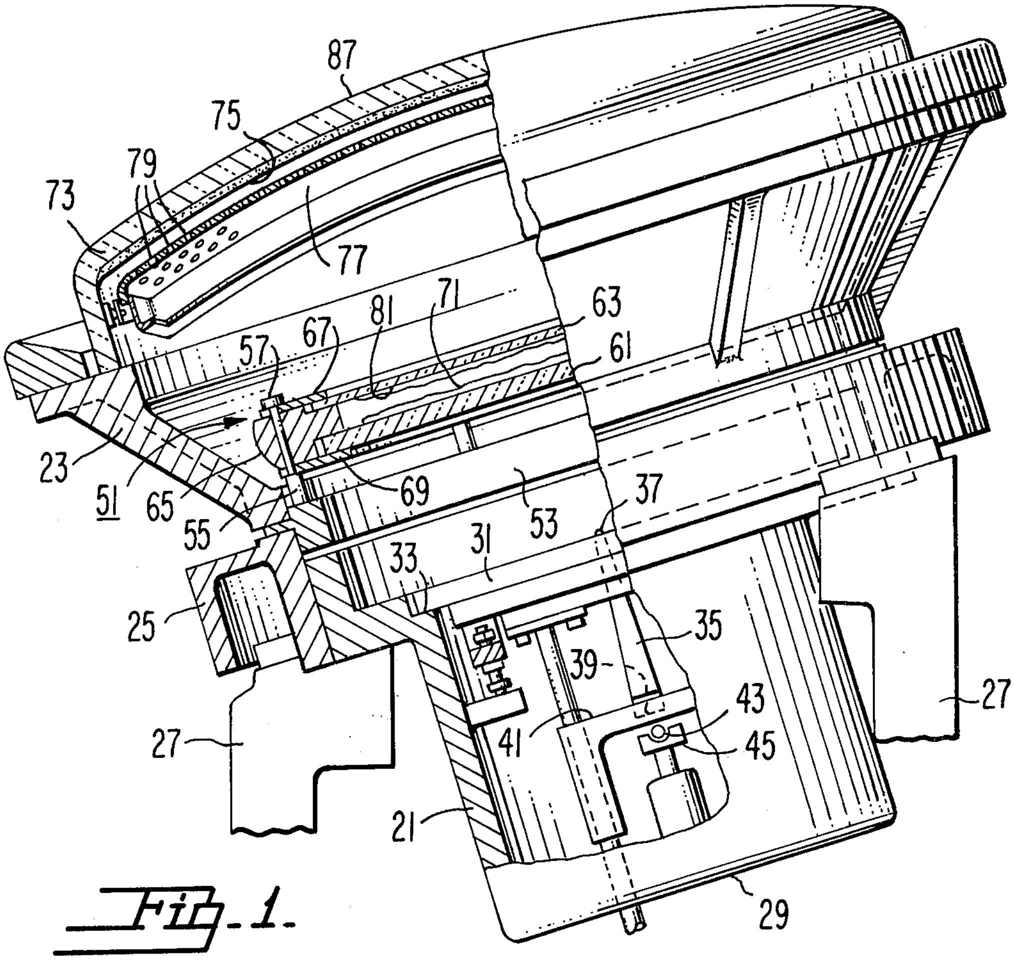
FIG. 1 is a partially broken-away elevational view of a lighthouse having a supplemental intensity-correction filter prepared by the novel method. The lighthouse has a faceplate panel thereon in position for exposure.

One lighthouse suitable for practicing the novel method is illustrated in FIG. 1 and is comprised of a light box 21 and a panel support 23 held in position by bolts (not shown) with respect to one another on a base 25 which in turn is supported at the desired angle by legs 27. The light box 21 is a cylindrical cup-shape casting closed at one end by an integral end wall 29. The other end of the light box 21 is closed by a plate 31 which fits in a circular recess 33 in the light box 21. The plate 31 has a central hole therein through which a light pipe 35 (referred to as a collimator in the tube-making art) in the form of a tapered quartz glass rod extends. The narrow end 37 of the light pipe 35 extends slightly beyond the plate 31 and constitutes the small area or substantially point light source of the lighthouse. The wider end 39 of the light pipe 35 is held in position by a bracket 41 opposite an ultraviolet lamp 43 within the light box 21. A light reflector 45 is positioned behind the lamp 43.

A lens assembly 51 is mounted on a lens assembly support ring 53 and stand-off spacers 55 with bolts 57. The support ring 53 is clamped in position between the light box 21 and the panel support 23. The lens assembly 51 is comprised of a refracting correction lens 61 and a glass plate 63 held and spaced from each other by a separating ring 65, an upper clamp 67 and a lower clamp 69. The upper surface of the correction lens 61 has thereon a main light-intensity-correction filter or main filter 71. The glass plate 63 is thin (about 0.25 inch), is of optical-quality and carries a supplemental intensity-correction filter or supplemental filter 81. The filters 71 and 81 are in the form of a relief image comprised of preformed carbon particles in gelatin or other clear colorless binder. The filter has essentially a neutral gray transmittance varying only in the degree of transmittance. The transmittance varies from point-to-point so that the point-to-point variations in brightness in the light field are reduced according to a prescribed plot.

In one example for operating the lighthouse shown in FIG. 1, a faceplate panel 73 having a photosensitive layer 75 comprised of dichromatized polyvinyl alcohol binder and green-emitting phosphor particles on the inner surface thereof and an apertured mask 77 mounted therein is placed in position on the panel support 23 as shown in FIG. 1. A light field from the narrow end 37 of the light pipe 35 passes upwardly through the correction lens 61, the filters 71 and 81 and the glass plate 63. The light field then passes upwardly through the apertures 79 on the mask 77. The light passing through the apertures falls incident upon the photosensitive layer 75, exposing the binder therein, thereby changing its solubility characteristics. The light source 37 has a diameter of about 13 mils (0.130 inch). The exposure continues for a desired time interval and then the light from the light source 37 is eclipsed. The panel assembly is removed from the lighthouse, the mask 77 is removed from the assembly, and the coating 75 is developed by flushing with water. Unexposed areas of the coating 75 are flushed away by the water, and the exposed areas are retained in place.

The method may be repeated as described above for making the blue-emitting-phosphor elements by substituting blue-emitting-phosphor particles for the green-emitting-phosphor particles in the coating 75. This latter coating is applied over the green-emitting-phosphor elements. The mask 77 is again inserted in the faceplate panel 73 and the coating is exposed on a second lighthouse. The second lighthouse is similar to the first lighthouse except that it may have a different relative light source position and a different lens assembly 51 and different filters 71 and 81 tailored for that field of phosphor elements. After exposure on the second lighthouse, the coating 75 with the blue-emitting phosphor therein is developed as described above to remove the unexposed portions of the coating 75. The exposed portions are retained in place.

The method may be repeated again as described above for making the red-emitting phosphor elements by substituting red-emitting phosphor for the green-emitting phosphor in the coating 75. This latter coating is applied over the green-emitting and blue-emitting phosphor elements. The mask 77 is again inserted in the faceplate panel 73, and the coating is exposed on a third lighthouse. The third lighthouse is similar to the first lighthouse except that it may have a different relative light source position and a different lens assembly 51 and different filters 71 and 81 tailored for that field of phosphor elements. After exposing the coating with the red-emitting phosphor therein on the third lighthouse, the coating is developed to remove the unexposed portions of the coating 75, and the exposed portions are retained in place.

After the phosphor elements have been printed, the structure is filmed, aluminized and baked out at about 420° C by methods known in the art. The completed screen structure is then assembled, with other parts, into the faceplate panel assembly, and the panel assembly incorporated into a completed tube.

Preparing the Supplemental Filter

The supplemental filter 81 is supported on the separate optical element 63 as a matter of convenience for its preparation, and so that it may be replaced by another supplemental filter when desired. The main filter 71 may be prepared by the methods described in U.S. Pat. Nos. 3,592,112 to H. R. Frey or 3,676,129 to F. R. Ragland. The supplemental filter 81 may be prepared by the following procedure, as an example.

Figure 2:
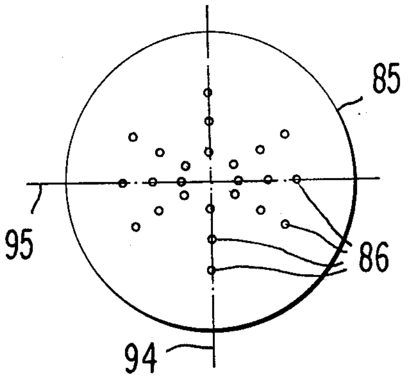
FIG. 2 is a plan view of a disc used for relating points on the support for the supplemental filter with points on the inner surface of the faceplate panel.
Figure 3:
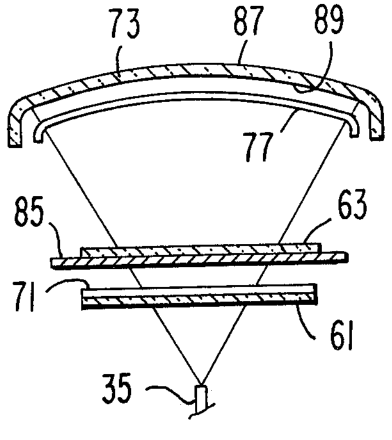
FIG. 3 is a schematic sectional view of a lighthouse illustrating how to use the disc shown in FIG. 2.

The separate optical element is a clear, flat, optical-quality glass plate 63. Instead of a glass plate, a flat, clear sheet of plastic may be substituted. In order to relate points of the light field on the light-source side of the glass plate 63 and corresponding points on the inner surface of the faceplate panel 73, the lens assembly 51 is assembled with the glass plate 63 but without the supplemental filter 81. In place of a supplemental filter, there is inserted an opaque disc 85 (about 0.02-inch thick) having therein an array of uniformly spaced holes 86 (about 0.02-inch in diameter) along the major, minor and diagonal axes of the light field. A typical disc 85 is shown in FIG. 2 and its position in the lighthouse is shown schematically in FIG. 3. A faceplate panel 73 without a mask 77 is positioned on the lighthouse, and a light field is projected through the assembly onto the inner surface 89 of the faceplate panel 73. The location of the light spots projected through the holes 86 of the disc 85 is marked directly on the outer surface 87 of the panel 73.

The disc 85 is now removed from the lens assembly, and the lens assembly 51 without the supplemental filter 81 is reassembled and reinserted in the lighthouse as shown in FIG. 4. The faceplate panel 73 is removed from the lighthouse and coated with the desired photosensitive layer 75, for example dichromatized polyvinyl alcohol containing phosphor particles. The apertured mask 77 is inserted in the panel 73 and the panel assembly is placed on the lighthouse as shown schematically in FIG. 4. Then, the layer 75 is exposed to a light field projected from the light pipe 35, and the exposed layer 75 is developed in the usual way to produce a screen structure comprised of an array of screen-structure elements, dots in this case.

The sizes of the screen-structure elements at each of the points marked on the faceplate panel 73 are now measured, the sizes are compared with the sizes of screen elements of a desired screen structure, and the differences are noted. The differences in sizes may be positive or negative. By simple computation all of the differences are re-expressed as negative differences using the most positive value as zero in the re-expression. Next, the negative difference values are translated by computation into differences in brightness of the exposing light at the marked points of the light field which are required to adjust the sizes of the dots to the sizes desired. To this end, a gamma curve 90 of the type shown in FIG. 5 may be used for this purpose. There is a characteristic curve relating screen-element size with exposure for each photosensitive layer, which curve is determined experimentally by known methods.

The computed brightness-difference values at the marked points on the faceplate also apply to the corresponding points at the surface of the glass plate 63. These values are now plotted on an area the size of the glass plate 63, and points of equal size differences are connected to produce a contour map of the size differences as shown, for example, in FIG. 6. In FIG. 6, the peripheral area 91 needs the most change of two exposure units, the intermediate area 92 needs the least change of one exposure unit, and the central area 93 needs no change. Light-opaque stencils 92*s* and 93*s* are made of each of the areas 92 and 93 respectively using the center lines 94 and 95 to maintain registry. Light-opaque stencils are made by cutting opaque sheet material, such as paper or metal, to the plotted size and shape of the area of interest.

One surface (which eventually will face the lightpipe 35) of the glass plate 63 is now coated with a layer 96 of a carbon-containing photobinder, such as that disclosed by the above-cited patent to H. R. Frey. One of the stencils is placed on the glass-plate surface opposite the surface carrying the carbon-containing layer 96, as shown in FIG. 7. The carbon-containing layer 96 is exposed through the stencil 92*a* to one unit of flood light exposure, indicated by the arrows 97; for example, for 5 minutes. Then, the first stencil 92*s* is replaced with the second stencil 93*s*, and the carbon-containing layer 96 is again exposed to one unit of flood light exposure through the stencil 93.

The exposed carbon-containing layer 96 is developed in the manner described in the above-cited patent to H. R. Frey. The developed image is well adhered to the glass plate 63 and constitutes the supplemental filter 81. The supplemental filter 81 provides differences in light transmission through differences in thickness of the retained carbon-containing photobinder. This is illustrated in the enlarged sectional view of a fragment of the filter in FIG. 8 with areas 91*a*, 92*a*, and 93*a* of the filter 81 corresponding to the areas 91, 92, and 93 respectively in the plot shown in FIG. 6.

Some General Considerations

The use of a supplemental filter separate from the main filter has many advantages over the use of a single filter having all of the corrections built in. Where it is desired to modify a main filter, it is much easier to construct the modifications than to construct a new filter with all corrections therein. This may occur where the main filter may be incorrect, or where the needs of the product facility have changed requiring modification.

The particular novel method for making a supplemental filter itself has several advantages over making a main filter. The novel method makes it possible to prepare the supplemental filter at locations having limited equipment and technical skills. The novel method employs a uniform flood light field as shown in FIG. 7 which simplifies the exposure and makes the preparation of the supplemental filter independent of the collimator and the lighthouse lamp. Furthermore, the novel method employs an exposure on only a single photosensitive layer.

The supplemental filter may be made by employing preformed particles of carbon or any other light-attenuating material in a light-transmitting binder. The filter may also be made of silver particles in a binder prepared from a silver halide emulsion film. While the supplemental filter may reside on any surface of the lens assembly, it is preferred that the supplemental filter reside on one surface of a separate optical element so that it may be easily and quickly replaced should it be desired. It is also preferred that the supplemental filter reside on a surface interior to the lens assembly and not on an exterior surface where it is not protected from abrasion, from heat, and from ultraviolet light. While the example herein is given with respect to aperture masks having circular apertures, the invention may be used in conjunction with masks having apertures of any size or shape. Also, the invention may be used in conjunction with any small area light source which may be of any shape; for example, point, line, circular, annular and elongated.

We claim:

1. An exposure lighthouse for use in photographically printing a screen structure for a cathode-ray tube including a faceplate panel, said lighthouse comprising means for holding said faceplate panel, a small area light source in a defined spatial relationship with said holding means and adapted to project a light field upon the inner surface of a faceplate panel in said holding means and a lens assembly positioned in the path of said projected light field, said lens assembly including a diffracting optical element, a main intensity-correction filter comprised of preformed carbon particles in a light-transmitting binder, and a supplemental intensity-correction filter comprised of preformed carbon particles in a light-transmitting binder, said supplemental filter residing on a light-transmitting support and being optically in series with said main intensity-correction filter.

* * * * *